Sept. 26, 1933.  W. SMITH  1,928,271

TWIST COUNTER

Filed March 31, 1931  2 Sheets-Sheet 1

Inventor
W. Smith
By C. A. Snow & Co.
Attorneys.

Sept. 26, 1933.    W. SMITH    1,928,271
TWIST COUNTER
Filed March 31, 1931    2 Sheets-Sheet 2
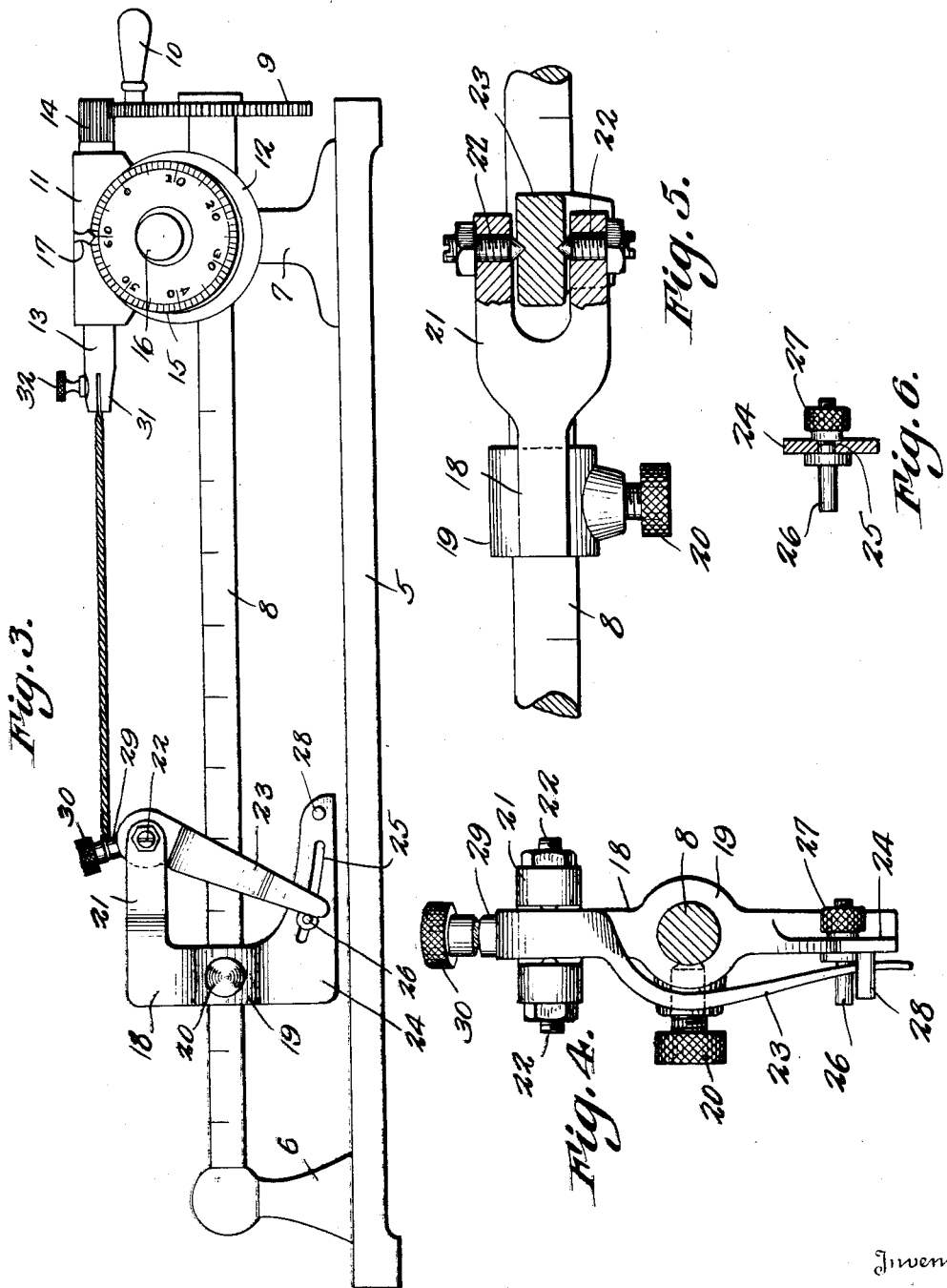
Inventor
W. Smith
By C.A. Snow & Co.
Attorneys Patented Sept. 26, 1933

1,928,271

UNITED STATES PATENT OFFICE 1,928,271

TWIST COUNTER

William Smith, New Bedford, Mass.

Application March 31, 1931. Serial No. 526,726

2 Claims. (Cl. 73—51)

This invention has reference to a machine designed for use in counting or determining the number of twists per inch in a length of yarn.

An important object of the invention is to provide a device of this character which may be operated to determine the accuracy of a count, by making a countertwist in the length of yarn under test.

A still further object of the invention is the provision of means for adjusting the machine for use in twisting yarn of various lengths.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is an elevational view of the device illustrating the position of the indicating finger after a counter twist has been made in the yarn.

Figure 4 is a sectional view taken on line 4—4 of Figure 2.

Figure 5 is a sectional view through the bearing of the indicating finger.

Figure 6 is a sectional view taken on line 6—6 of Figure 2.

Figure 1:
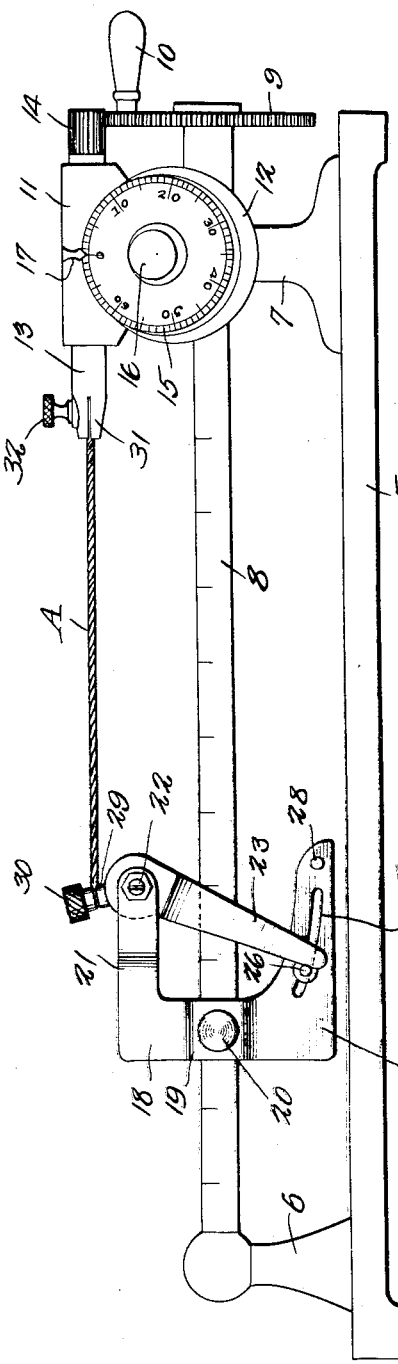
Figure 1 is an elevational view of a yarn twist counting device constructed in accordance with the invention.

Referring to the drawings in detail, the twist counter forming the subject matter of this invention, comprises a base 5, which may be of any desired construction, the base being supplied with upstanding posts 6 and 7 respectively, the posts being formed with openings to receive the shaft 8.

As shown, the posts 6 and 7 are supported appreciable distances apart, so that the shaft 8 is supported at its ends. Rotatably mounted on one end of the shaft 8, is a gear 9 which is provided with a handle 10, by means of which the gear may be rotated for purposes to be hereinafter more fully described.

The reference character 11 designates a tubular bearing which is formed on the disk like support 12, that in turn is secured to the post 7, the bearing 11 being constructed to support the shaft 13 that carries the pinion 14 at one end thereof, which pinion meshes with the gear 9, so that rotary movement of the gear 9 may be imparted to the shaft 13.

The reference character 15 designates a dial which is mounted on the shaft 16 that extends through the center of the dial, providing a bearing therefor.

Suitable gearing, not shown, is provided within the bearing 11, so that as the shaft 13 is rotated, the dial 15 will be rotated. Suitable graduations are provided on the dial, and are so arranged that the number of rotations of the shaft 13, will be indicated on the dial, by viewing the numbers on the dial appearing directly under the indicator 17.

The reference character 18 designates an adjustable supporting member, which is formed with an enlarged portion 19 having an opening to accommodate the shaft 8, in such a way that the adjustable supporting member may be moved longitudinally of the shaft 8, to adapt the device for use in connection with yarn of predetermined lengths. A set screw indicated at 20 acts to hold the adjustable supporting member 18 in its positions of adjustment along the shaft 8.

Formed at the upper end of the adjustable supporting member 18, is an arm 21 which is formed with a bifurcated end portion having openings to receive the pins 22 that are adjustably held therein, the pins having tapered inner extremities, fitted in depressions formed at opposite sides of the finger 23, to the end that the finger 23 will swing freely on the pins 22. As shown, this finger 23 is formed with a laterally curved portion, curved around the shaft 8, the lower end of the finger 23 extending to a point an appreciable distance below the shaft 8.

Extending from the lower end of the adjustable supporting member 18, is an arm 24 which is formed with a curved slot 25 in which the stop pin 26 is adjustably held, the stop pin being provided with a knurled nut 27, to hold the stop pin in its positions of adjustment throughout the length of the slot. Near the free end of the arm 24, is a stop pin 28 which is stationary and acts to restrict movement of the indicating finger 23, to prevent the finger 23 from swinging too far.

On the upper end of the finger 23, is an enlargement 29 which cooperates with the knurled nut 30 which operates on a threaded shank extending from the enlargement 29, in gripping the yarn under test, therebetween, in such a way as to securely hold the yarn connected with the finger 23.

The yarn which is shown for the sake of illustration, is indicated by the reference character A, and has its opposite end gripped within the jaws 31 of the shaft 13, the jaws being moved into gripping relation with each other by means of the nut 32.

In the use of the device, a predetermined length of yarn is positioned in the machine, one end of the yarn being gripped within the jaws 31, while the opposite end thereof is held between the enlargement 29 and nut 30. With the yarn in this position, the dial is in a position where the indicator 17 points to zero. The handle 10 is now operated to rotate the gear 9 which in turn transmits movement to the shaft 13 through the pinion 14. As the shaft 13 rotates, the yarn is untwisted, the dial moving under the indicator 17, indicating the number of twists in the length of yarn.

In order to verify the accuracy of the machine, the gear 9 is further rotated, countertwisting the yarn, which countertwisting of the yarn is continued until the finger 23 contacts with the stop pin 26.

Figure 2:
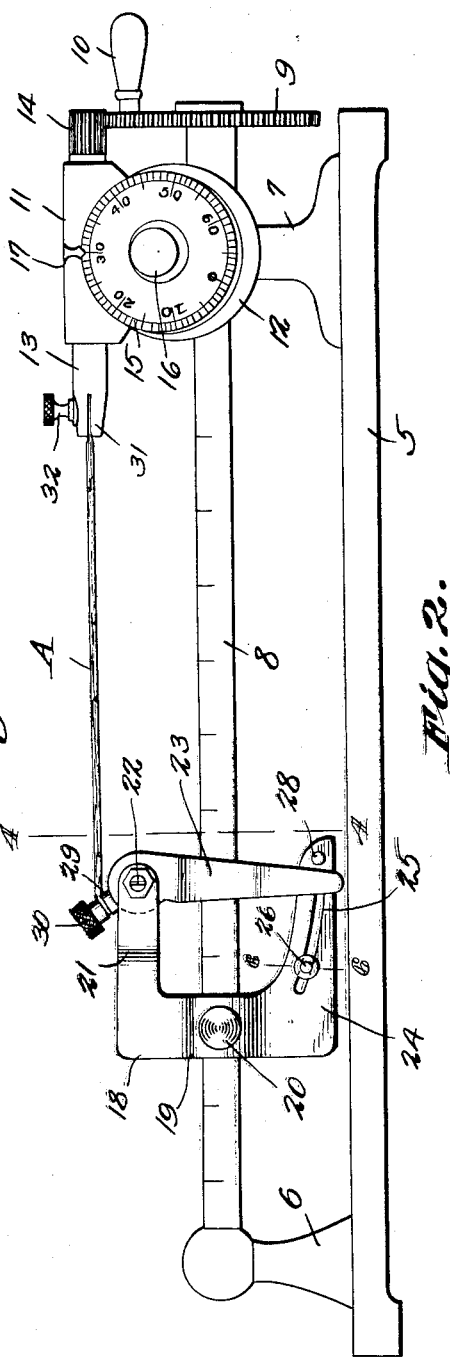
Figure 2 is a side elevational view illustrating the position of the indicating finger, after the yarn has been rotated to remove the twists therein.

If the number of rotations of the shaft 13 to untwist the yarn A are 30, it is obvious that by rotating the shaft 13 to countertwist the yarn, until the indicator 23 is moved from a position shown by Figure 2 of the drawings, to a position as shown by Figure 3, the number appearing on the dial directly under the indicator 17, will be 60, as shown by Figure 3, or twice the number of twists in the length of yarn, thereby indicating a complete check up on the machine.

It will of course be understood that when the yarn is positioned, prior to the twisting operation, the initial position of the finger 23 will be in contact with the pin 26.

I claim:

1. A yarn twist counter comprising a base, a graduated shaft mounted on the base, a supporting member slidably mounted on the shaft, means for holding the supporting member in its positions of adjustment along the graduated shaft, upper and lower arms extending in parallel spaced relation with each other, and supported by the supporting member, an indicating finger pivotally mounted on the upper arm, and movable adjacent to the lower arm, a stop pin on the lower arm, said lower arm having a curved slot, a stop pin positioned in the curved slot and adjustable throughout the length thereof, said stops being disposed within the path of travel of the finger, a rotary member at one end of the shaft, means for securing one end of a length of yarn to the rotary member, means for securing the opposite end of the yarn to the finger to move the finger when the yarn is twisted or untwisted, and means for indicating the number of rotations of the yarn under treatment.

2. A yarn twist counter comprising a base, a graduated shaft mounted on the base and arranged in parallel spaced relation with the base, a bearing, a yarn twisting shaft mounted in the bearing, an indicating means geared to the yarn twisting shaft for indicating the number of rotations of the yarn twisting shaft, a supporting member mounted for sliding movement longitudinally of the graduated shaft, parallel upper and lower arms extending from the supporting member, a pivoted finger mounted on one of the arms, and having clamping means for clamping one end of a length of yarn to the finger, the opposite end of the finger being disposed adjacent to the lower finger, a stationary stop on the lower arm limiting the movement of the finger in one direction, an adjustable stop on the lower arm and spaced from the stationary stop between which the finger moves, and said finger adapted to engage the stops limiting the movement of the finger, when the twisting shaft is rotated.

WILLIAM SMITH.